April 10, 1956 H. KEEN 2,741,702

AUTOMATIC TUNING SYSTEM FOR TRANSMITTERS AND RECEIVERS

Filed Feb. 9, 1952 6 Sheets-Sheet 1

INVENTOR
Harry Keen
BY Robert E. Burns
ATTORNEY

April 10, 1956 H. KEEN 2,741,702

AUTOMATIC TUNING SYSTEM FOR TRANSMITTERS AND RECEIVERS

Filed Feb. 9, 1952 6 Sheets-Sheet 2

INVENTOR.
Harry Keen
BY Robert E. Burns
ATTORNEY

April 10, 1956 H. KEEN 2,741,702

AUTOMATIC TUNING SYSTEM FOR TRANSMITTERS AND RECEIVERS

Filed Feb. 9, 1952 6 Sheets-Sheet 3

INVENTOR.
Harry Keen
BY Robert E. Burns
ATTORNEY

April 10, 1956 H. KEEN 2,741,702

AUTOMATIC TUNING SYSTEM FOR TRANSMITTERS AND RECEIVERS

Filed Feb. 9, 1952 6 Sheets-Sheet 4

INVENTOR.
Harry Keen
BY Robert E. Burns
ATTORNEY

April 10, 1956 H. KEEN 2,741,702

AUTOMATIC TUNING SYSTEM FOR TRANSMITTERS AND RECEIVERS

Filed Feb. 9, 1952 6 Sheets-Sheet 5

INVENTOR.
Harry Keen
BY Robert E. Burns
ATTORNEY

April 10, 1956 H. KEEN 2,741,702

AUTOMATIC TUNING SYSTEM FOR TRANSMITTERS AND RECEIVERS

Filed Feb. 9, 1952 6 Sheets-Sheet 6

INVENTOR.
Harry Keen
BY Robert E. Burns
ATTORNEY

United States Patent Office 2,741,702
Patented Apr. 10, 1956

2,741,702

AUTOMATIC TUNING SYSTEM FOR TRANSMITTERS AND RECEIVERS

Harry Keen, Middletown, N. J.

Application February 9, 1952, Serial No. 270,887
19 Claims. (Cl. 250—40)

The present invention relates to automatic tuning or selecting systems and particularly to such systems operated by fluid pressure. The system in accordance with the present invention is applicable to many uses, as, for example, where a series of units or elements are to be tuned or selected in sequence. While it is herein illustrated and described as applied to the tuning of a radio transmitter-receiver, the invention is in no way limited to such application. For convenience of expression, the term "tuning" is herein used in a generic sense to include, for example, selecting, setting, adjusting or regulating electrical, mechanical, pneumatic, hydraulic or other units or devices.

It is an object of the invention to provide a tuning system that is simple and reliable in construction and operation and that will tune to a given signal quickly and accurately. The signal may, for example, be an electrical or other oscillation or radiation of predetermined frequency, wave length or intensity or other electrical, sonic, optical or mechanical signal transmitted by a signal or control device associated with the equipment to be tuned or received from a remote transmitter.

A further object of the invention is to provide a tuning system comprising a plurality of tuning units, all controlled by a master control circuit so as to operate sequentially in a predetermined cycle and to restore the system automatically to "normal" position upon completion of the cycle. If, for any reason, the cycle is not completed, the system will, after a predetermined lapse of time, automatically restore itself to "normal" position so that a new cycle can be commenced.

It is another object of the invention to provide a fluid-operated system for a plurality of tuning units connected in parallel to a common source of fluid pressure but separately controlled by an electrical control circuit to tune each unit individually.

A further object of the invention is to provide a new and improved fluid-operated electrically controlled tuning unit and an improved electrical circuit for controlling the unit.

Other features, advantages and characteristics of the invention will be more fully understood from the following description and claims in conjunction with the accompanying drawings which illustrate, by way of example, a preferred embodiment.

Figure 1:
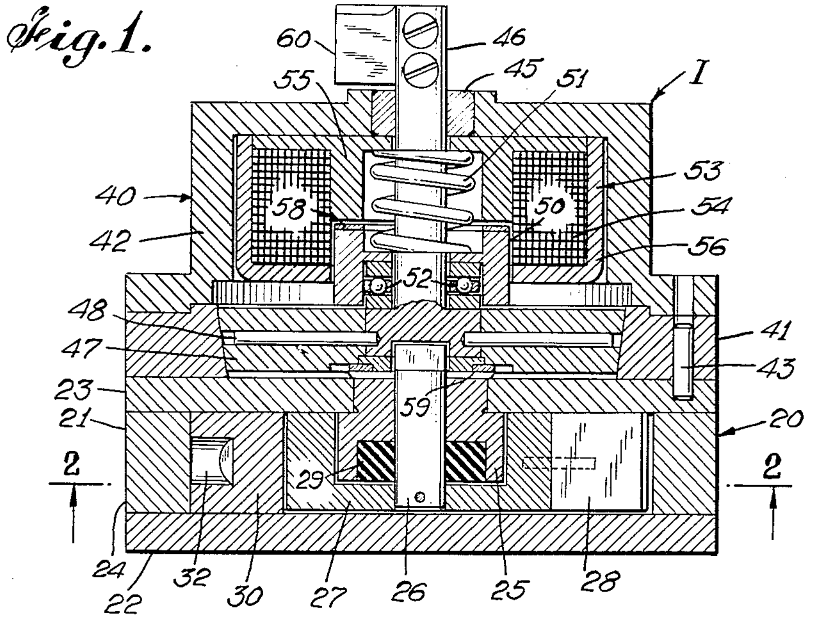
Fig. 1 is an axial section of a tuning unit in accordance with the invention, the section being taken approximately on the line 1—1 in Fig. 2.

The tuning system illustrated, by way of example, in the drawings is intended particularly for effecting the automatic signal-seeking tuneup of a radio transmitter-receiver so as to transmit and receive on any of a number of different channels. As shown in the drawings, the tuning system comprises one or more tuning units which are operated by fluid pressure and are electrically controlled, a fluid pressure system for operating the tuning units and an electrical control circuit controlling the fluid pressure system and the tuning units. A tuning unit is provided for each of the tunable elements or circuits of the equipment that is to be tuned by the system. The fluid pressure system and tuning control circuit are common to all of the tuning units.

The term "fluid pressure" is herein used to designate a pressure differential, it being understood that the pressures used may be either above or below atmospheric pressure.

The desired channel or signal is selected by the operator, for example by the push-button operation of a local control box or by dialing a remote control panel. This selects a signal provided, for example, by a crystal circuit of predetermined frequency and also initiates the operation of the tuning control circuit. Under control of the tuning control circuit, the tuning system in accordance with the invention first sets each tunable circuit of the equipment to the low frequency end of its range. The first stage of the transmitter is then tuned rapidly from the low frequency end of the range toward the high frequency end until the selected signal is found. When the signal has been found, the tuning direction is reversed and the speed is reduced. The signal is then scanned slowly and the signal peak level is recorded in a memory circuit. After the signal peak has been passed in a reverse direction, the tuning direction is again changed to "forward" and the first transmitter stage is brought back to the signal and locked. The tuning system then follows a similar sequence in successively tuning up the following stages of the transmitter and the harmonic generator and signal frequency circuits of the receiver, the latter being tuned on a signal obtained by attenuation of the transmitter output. If any of the tuneup signals are absent, the tuning will not be completed but after a predetermined time elapse, the tuning control circuit is automatically returned to "normal" and shut off so that it is ready to begin a new tuning cycle.

Figures 2, 3:
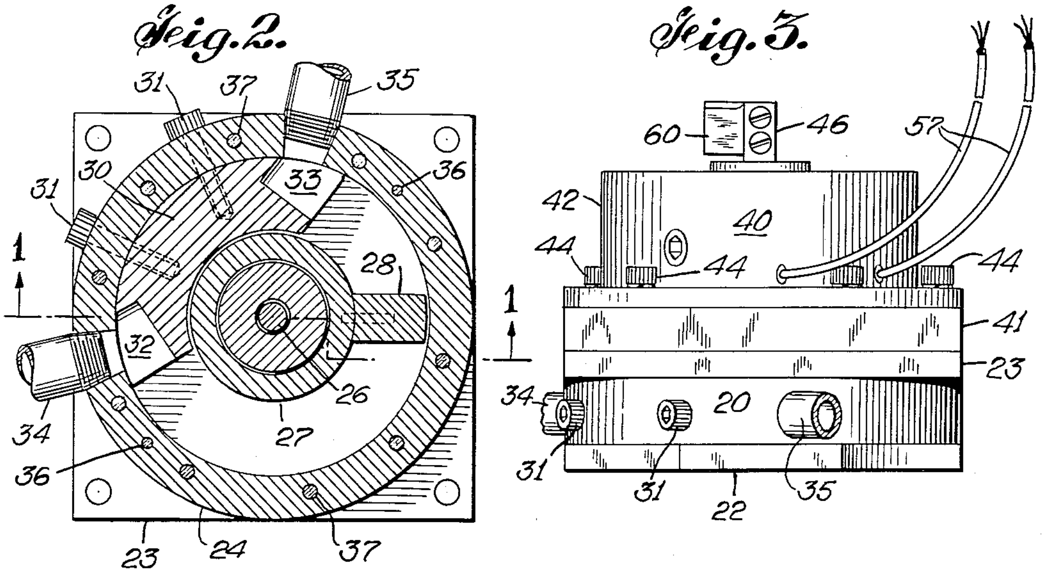
Fig. 2 is a cross-section taken approximately on the line 2—2 in Fig. 1.
Fig. 3 is a side elevation.

A tuning unit is illustrated in Figs. 1 to 3. It comprises a hydraulic motor 20 and an electromagnetically operated brake 40.

The hydraulic motor 20 has a housing 21 comprising a bottom plate 22, a top plate 23 having a central aperture and a spacing ring 24. A bearing 25 pressed in the aperture of the top plate 23 rotatably supports a shaft 26, the upper end of which projects above the bearing and is non-circular, for example flat. A cup-shaped rotor 27 is pinned to the lower end of the shaft 26 and carries a radially projecting impeller or vane 28 constituting a rotary piston. An annular self-sealing gasket 29 made, for example, of a rubber-like composition is seated in an annular recess in the lower end of the bearing 25 and provides a fluid-tight seal between the shaft 26 and the bearing without materially impeding the rotation of the shaft. A ring segment 30 is positioned between the bottom plate 22 and top plate 23 inside the spacing ring 24 and is secured in place, for example by screws 31. The segment 30 forms a stop for the rotor vane 28 and is provided with fluid inlet and outlet ports 32, 33 which communicate, respectively, with fluid conduits 34, 35. The parts of the housing 21 are accurately positioned relative to one another and secured together, for example by dowel pins 36 and screws 37. The surfaces of the rotor 27, including the vane 28 and the inter-engaging surfaces of the bottom 22, top 23, spacer 24 and segment 30, are accurately finished, for example by grinding and lapping, so that the parts fit accurately and a fluid-tight seal is provided between the housing members without gaskets.

The brake 40 comprises an annular brake drum 41 and a housing 42 which are suitably assembled with one another and with the rotor housing 21, for example by means of dowel pins 43 and screws 44. The inverted cup-shaped housing 42 has a central aperture to receive a bearing 45 for a rotatable brake shaft 46 having an enlarged lower end to which a brake disc 47 is affixed, for example by radial pins 48. The periphery of the brake disc 47 is tapered and is adapted to engage the inner periphery of the brake drum 41 which is correspondingly tapered, so that the brake disc can be brought into engagement with the brake drum by axial movement in a downward direction and released by a slight axial movement in an upward direction. The lower end of the brake shaft 46 has a non-circular recess to receive the non-circular upper end of the rotor shaft 26 of the hydraulic motor, so that the two shafts rotate together while limited axial movement of the brake shaft is permitted. An annular presser block 50 having an inwardly projecting flange intermediate its ends is pressed downwardly by a strong helical spring 51 surrounding the brake shaft 46 and, in turn, exerts a downward pressure through an anti-friction thrust bearing 52 on the enlarged lower end of the brake shaft 46 and the brake disc 47 carried by it. Upward movement of the presser block 50 against the action of the spring 51 is effected by means of an electromagnet 53 having a winding 54 and a core 55 and cage 56 of magnetic material. The presser block 50 is also of magnetic material and constitutes an armature of the electromagnet, being drawn upwardly against the action of spring 51 when the electromagnet is energized. Leads 57 extend to the outside of the housing 42 for connection with the electrical circuit hereinafter described, for energizing the electromagnet. When the magnet is de-energized, the spring 51 pushes the brake shaft and disc downwardly to engage the brake. A washer 58 of non-magnetic material, for example brass, is interposed between the presser block 50 and the core 55 to assure quick release of the presser block. A spring washer 59 which is considerably weaker than the spring 51 exerts an upward thrust on the brake disc to disengage it from the drum 41 when the presser block 50 is retracted by energizing the magnet 53. Since the only radial bearing 45 for the shaft 46 is near the upper end of the shaft, the brake disc 47 is self-centering in the drum 41. At its upper end, the shaft 46 is provided with suitable means shown as a flag 60 for coupling it with the rotatable shaft or other movable member of the element to be tuned, for example a variable condenser.

In operation, the electromagnet 53 is energized to release the brake. With the brake released, the rotor 27, together with shafts 26 and 46, are turned by admitting pressure fluid through one of the ports 32, 33 and discharging it through the other. The direction of rotation of the shafts is reversed by reversing the direction of flow of the pressure fluid while the speed is determined by the rate of flow. When the tunable element has been tuned, as determined by the control circuit, the electromagnet 53 is de-energized so that the brake is applied by spring 51 to lock the shaft against further rotation. The brake resistance is sufficiently great to withstand the force of the pressure fluid on the vane 28 so that the shaft 46 is held against turning even though fluid pressure continues to be applied to the rotor vane.

Figure 4:
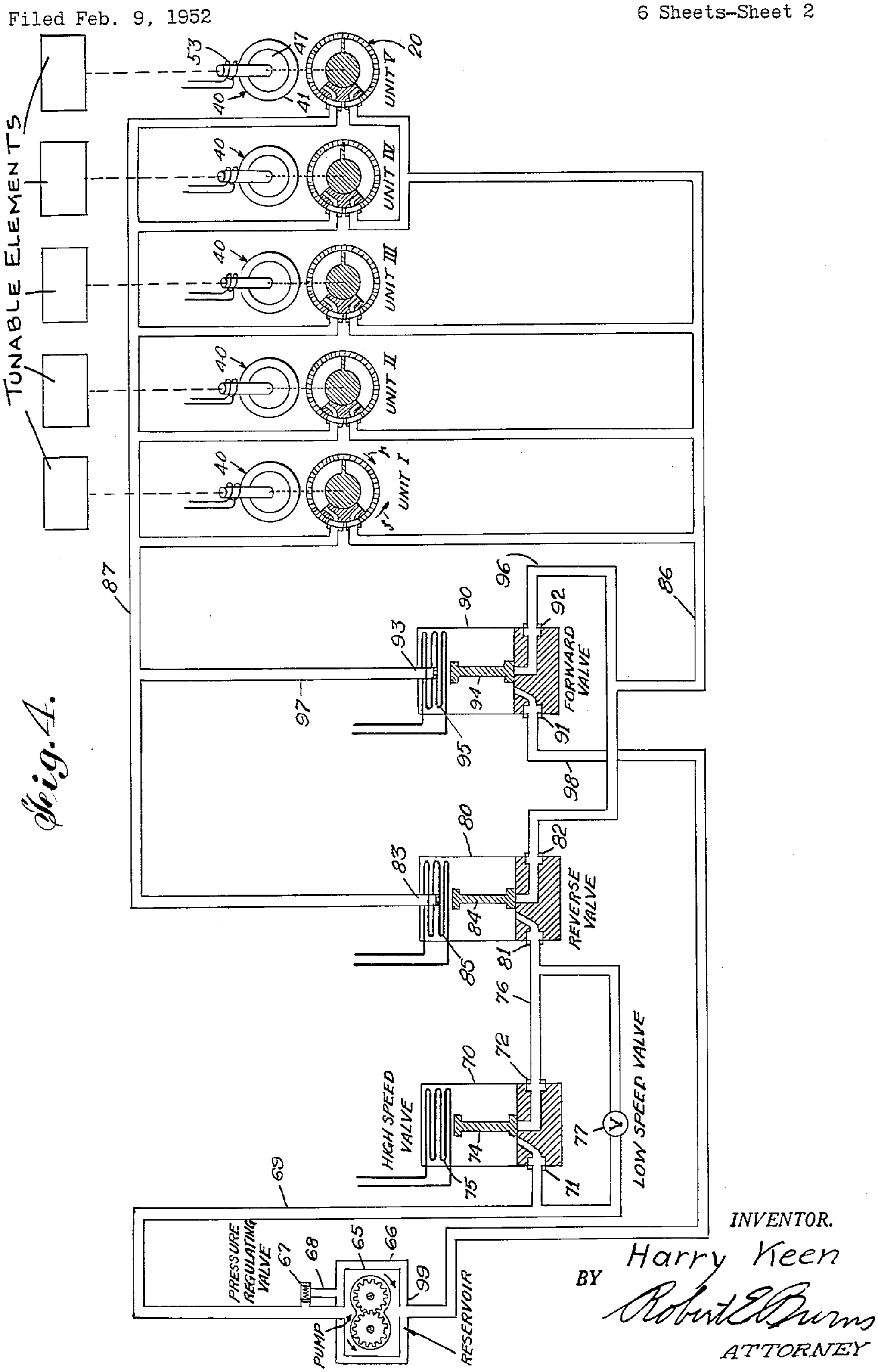
Fig. 4 is a schematic diagram showing a plurality of the tuning units operated by a common hydraulic system.
Figure 5:
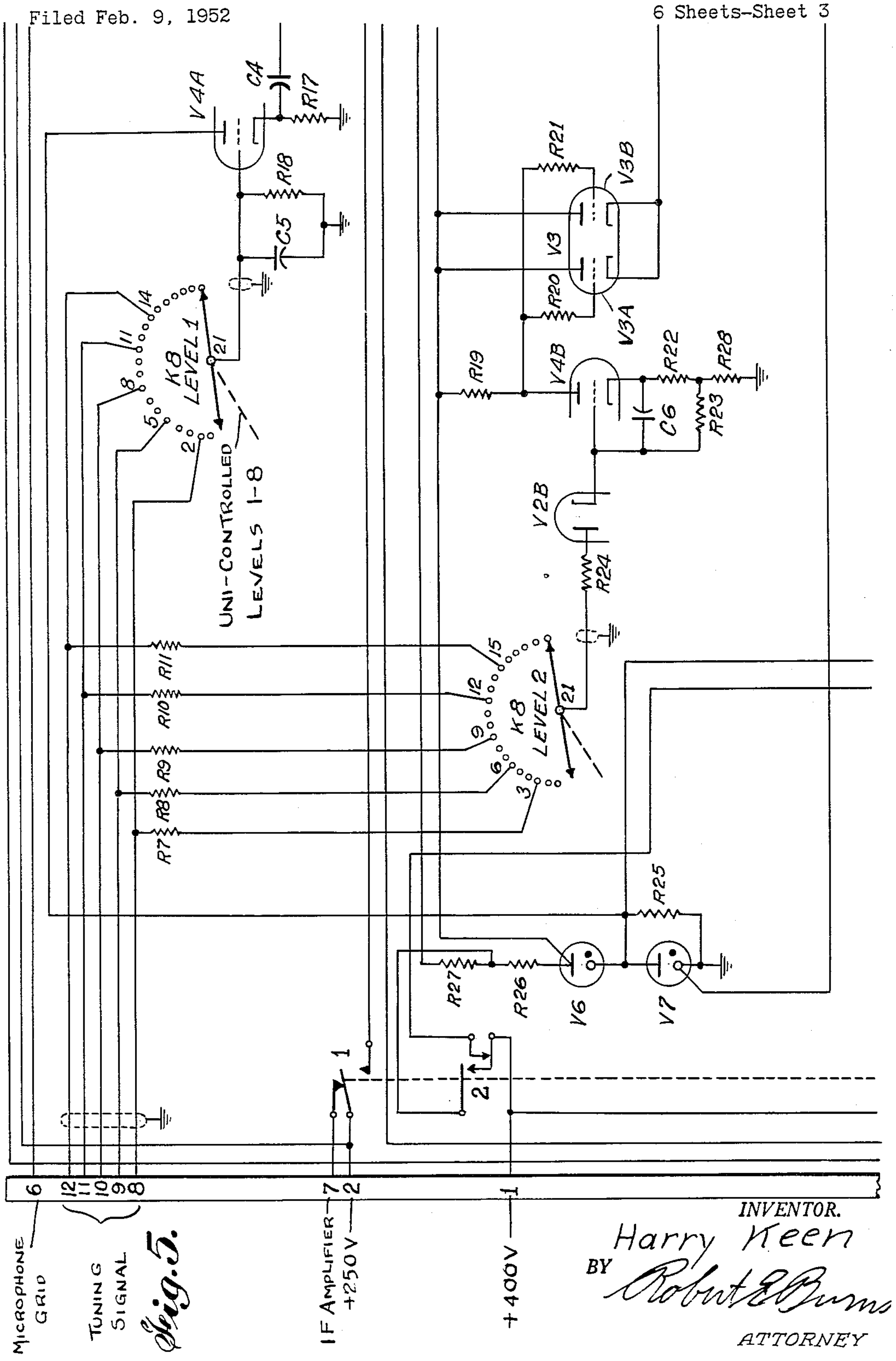
Figs. 5, 6, 7 and 8 are, together, a wiring diagram of the electrical circuit controlling the tuning units, the arrangement of the figures being indicated on the sheet containing Fig. 7.
Figure 6:
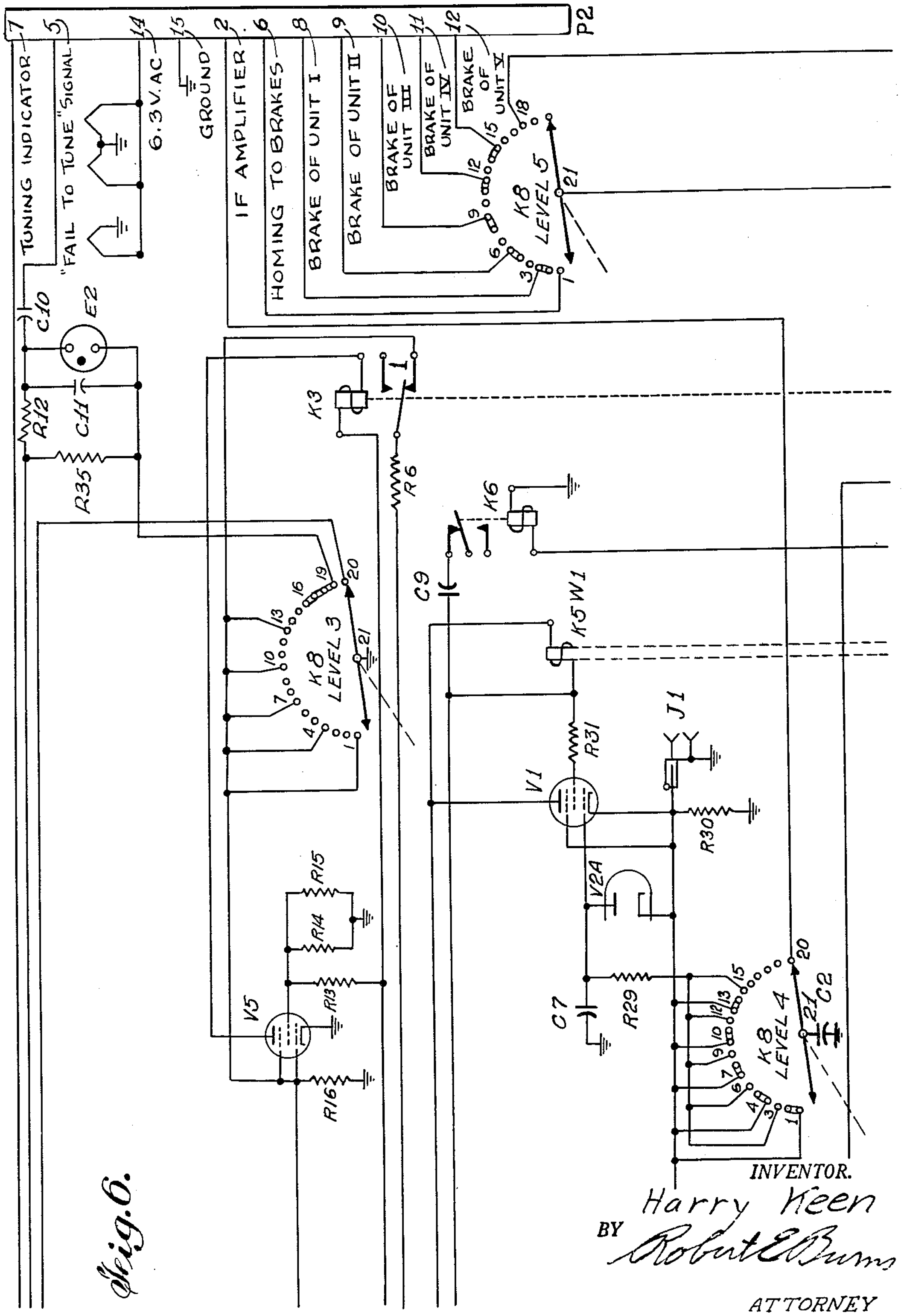
Figure 7:
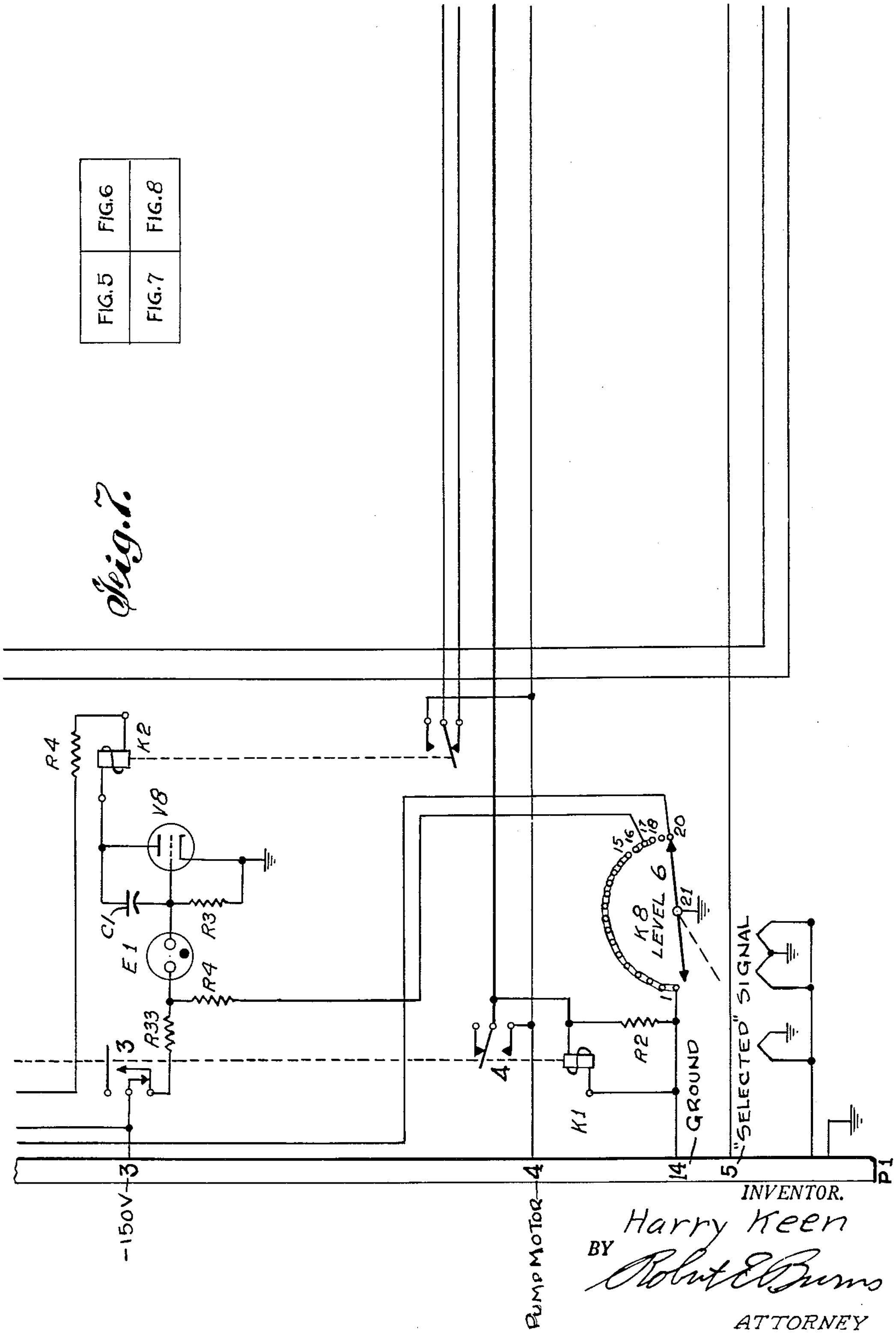

Fig. 4 shows schematically a fluid pressure system for operating a plurality of tuning units such as that shown in Figs. 1 to 3. There can be any desired number of tuning units, five such units being shown and numbered I to V, respectively.

The fluid pressure system comprises an electric motor-driven pump 65 having a supply reservoir 66. The pressure delivered by the pump is controlled by a pressure valve 67 having a by-pass 68 returning to the reservoir 66. A conduit 69 connects the output side of the pump with an inlet port 71 of a speed control valve 70 having a discharge port 72. A movable valve member 74 is biased toward a position in which it closes the port 72 and is retractable by an electromagnet 75. The discharge port 72 of valve 70 is connected by a conduit 76 with the inlet port 81 of a reverse valve 80. A regulator valve 77 is connected in parallel with the speed control valve 70 and is adjustable to provide a predetermined flow at the pressure delivered by the pump 65.

The reverse valve 80 has two additional ports 82 and 83 and a valve member 84 that normally closes port 82 but is movable by an electromagnet 85 to a position in which it closes port 83 while port 82 is open. The port 82 of valve 80 is connected with a conduit 86 while port 83 is connected with a conduit 87. The hydraulic motors of the tuning units I–V are connected in parallel between the conduits 86 and 87.

A forward valve 90 has three ports 91, 92 and 93 and a valve member 94 which normally closes port 92 but is movable by an electromagnet 95 to a position in which it closes port 93, thereby opening port 92. A conduit 96 connects port 92 of valve 90 with the above mentioned conduit 86 while a conduit 97 connects port 93 with conduit 87. Port 91 of valve 90 is connected by a conduit 98 to the inlet 99 of the reservoir 66.

In operation of the fluid pressure system, valve 70, in conjunction with the regulator valve 77, controls the speed at which the tuning units are operated. When "Hi-Speed" valve 70 is open (energized), substantially unrestricted flow of fluid is provided from the pump 65 to the inlet 81 of valve 80. When valve 70 is closed, the flow of fluid is attenuated by the adjustable regulator valve 77 and the tuning units are thereby operated at low speed.

Valves 80 and 90 together control the direction of rotation of the tuning units. With reverse valve 80 energized and forward valve 90 de-energized, fluid flows to the tuning units through port 82 and conduit 86 and returns to the reservoir 66 through conduits 87 and 97, ports 93 and 91 of valve 90 and conduit 98. With the forward valve 90 energized and reverse valve 80 de-energized, fluid flows from the port 83 of valve 80 through conduit 87 to the tuning units and back through conduits 86 and 96, ports 92 and 91 of valve 90 and conduit 98 to the reservoir 66.

While fluid pressure is supplied to all of the tuning units at the same time, since they are connected in parallel, a unit will be operated only when its brake is released by energizing the solenoid 53. Thus, the tuning units may be operated individually by energizing the brake-releasing solenoid of one unit while the solenoids of the other units are de-energized.

The operation of the tuning units and fluid pressure system shown in Fig. 4 is automatically controlled by the electrical circuit shown, by way of example, in Figs. 5 to 8. This tuning control circuit is shown as comprising connecting panels or plugs P1—P3, relays K1—K8, electronic tubes V1—V8, condensers C1—C11, resistances R1—R35, rectifiers CR1—CR3, gas discharge tubes E1—E2, a testing switch S1 and signal test terminal J1.

Each of the panels or plugs P1—P3 has fifteen terminals or pins which are numbered 1 to 15 although not all of the pins are used. The outside connections to pertinent pins are as follows:

PLUG OR PANEL P1

| Pin No. | Connection to— |
|---|---|
| 1 | +400 volt source. |
| 2 | +250 volt source. |
| 3 | −150 volt source. |
| 4 | Pump motor of fluid pressure system (Fig. 4). |
| 5 | "Selected" signal from crystal oven. |
| 6 | Microphone grid. |
| 7 | I. F. Amplifier. |
| 8 | First Tuning Signal. |
| 9 | Second Tuning Signal. |
| 10 | Third Tuning Signal. |
| 11 | Fourth Tuning Signal. |
| 12 | Fifth Tuning Signal. |
| 14 | Ground for Crystal Stepper. |

PLUG OR PANEL P2

| Pin No. | Connection to— |
|---|---|
| 2 | I. F. Amplifier. |
| 5 | "Fail to Tune" signal. |
| 6 | Homing circuit for brakes 40. |
| 7 | Tuning Indicator Remote Control. |
| 8 | Brake of Unit I (Fig. 4). |
| 9 | Brake of Unit II. |
| 10 | Brake of Unit III. |
| 11 | Brake of Unit IV. |
| 12 | Brake of Unit V. |
| 14 | 6.3 volts A. C. |
| 15 | Ground. |

PLUG OR PANEL P3

| Pin No. | Connection to— |
|---|---|
| 4 | Reverse Valve 80 (Fig. 4). |
| 5 | Forward Valve 90. |
| 6 | Hi-Speed Valve 70. |
| 7 | Crystal Selector. |
| 8 | Crystal Oven. |
| 9 | "Homed" signal from motor limit switches. |
| 11 | −24 volt source. |
| 12 | "Prepared" signal from oven. |

Relays K1, K3 and K4 each have four groups of contacts numbered 1 to 4. Each group comprises an operating contact and one or more cooperating contacts. Relays K2, K5, K6 and K7 are single-pole, double-throw relays. Relay K8 is a stepper relay which is shown as having eight banks or levels of contacts with twenty contacts in each bank. While, for convenience, the contacts are shown schematically as being arranged in a semi-circle, it will be understood that they may be a complete circle or may be otherwise disposed. At each level, there is a movable contact arm which successively engages the contacts at that level, all of the arms being connected together and "stepped" simultaneously by a stepper magnet. The operating magnets or windings of the relays are designated by the reference numbers of the respective relays with the addition of "W." Relay K5 has two windings K5W1 and K5W2. Contacts K8C, associated with the armature of the stepper relay K8, are opened when the relay is energized. The testing switch S1 permits operation of the stepper relay K8 to test its operation.

The condensers C1—C11 include a condenser C2 which is connected with the contact arm at level 4 of the stepper relay K8 and is herein referred to as the "memory condenser." The tubes are of the type indicated in the drawings, the two parts of certain double tubes being designated by the addition of reference letters "A" and "B," respectively, as, for example, V4A and V4B. Except as otherwise indicated, the resistances and condensers are of constant value during operation, although they may be variable for the purpose of adjusting the circuit. The connections between the several elements of the circuit are clearly shown in the drawings and will further appear from the following description of the operation of the tuning system.

*Operation*

Figure 8:
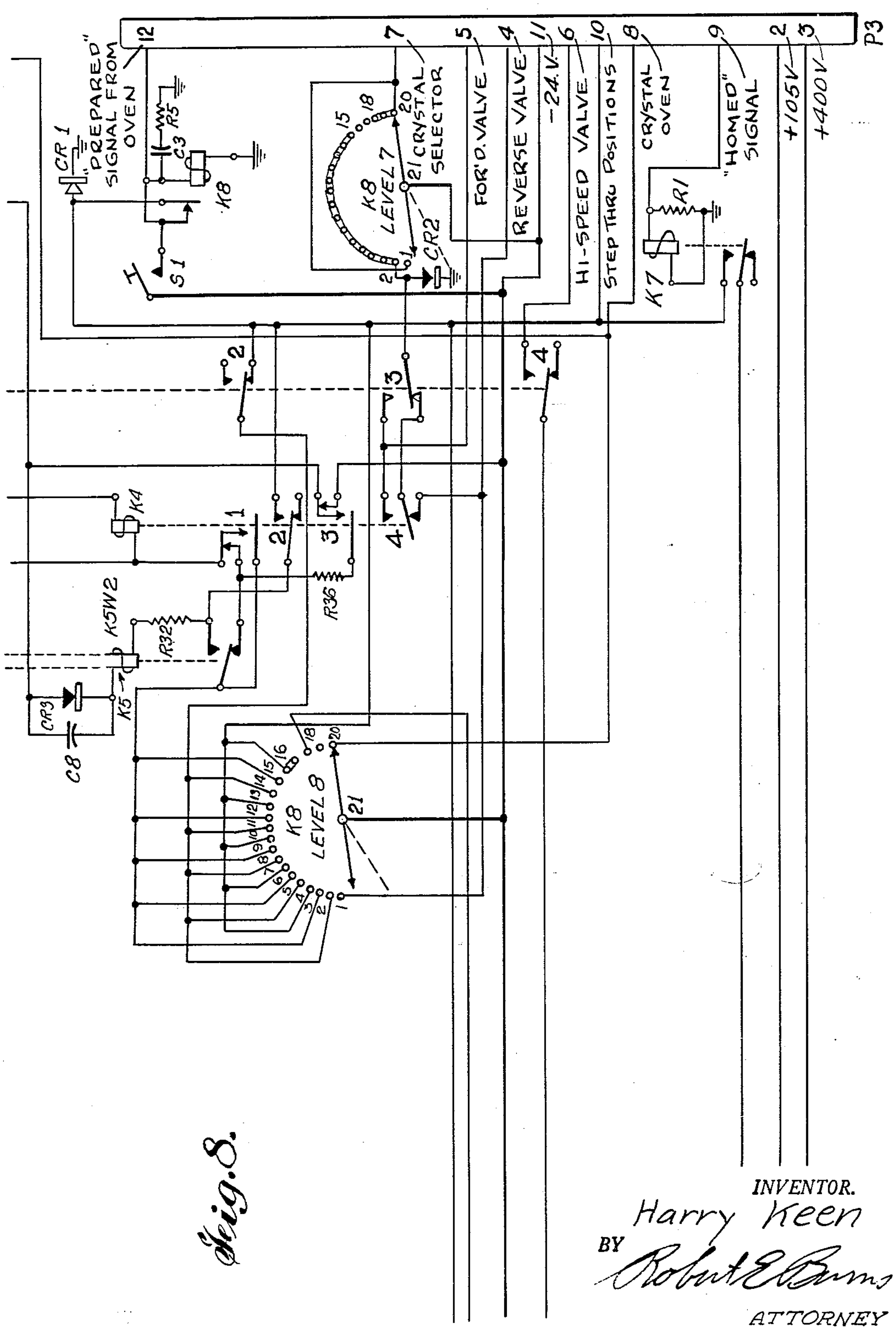

*Initiation of tune-up.*—When a new channel is selected, for example by the push button operation of a local control box or by dialing a remote control panel as described above, pulsing relays in the crystal oscillator actuate the crystal selector stepper magnet in order to select the desired crystal pair. Simultaneously, one of said pulsing relays closes a path from P3 pin 11 (−24 v. source) to P3 pin 12 (Fig. 8). This operates the stepper relay K8 from position 20 (normal) to position 1.

*Position 1.*—With the stepper relay K8 in position 1, level 3 of the relay removes ground from P1 pin 6 for the "push-to talk" circuit, so that transmission cannot be attempted, and applies ground to the grid of tube V5. This shorts out the bias applied through resistance R6 so that normal plate current flows through tube V5 operating relay K3. Level 4 connects the memory capacitor C2 to the cathode of tube V1. Level 5 applies −24 v. through P2, pin 6, to a "homing" circuit for the tuning unit. This "homing" circuit consists of a chain of SPDT microswitches one on each tuning shaft or cabled group of shafts and set to operate at the low frequency end of the tuning range of the respective shafts. −24 v. is applied to the "common" terminal of the first switch and, through the NC contact, to the brake 40 associated with that shaft, thereby releasing the brake. The hydraulic motor 20 of the tuning unit thereupon rotates the shaft to the low frequency end of its range and operates the switch to transfer the −24 v. from the first brake to the "common" terminal of the next switch in the chain where the cycle is repeated. When the last switch in the chain operates, the −24 v. is returned to P3 pin 9 as a "homing completed" signal which operates relay K7. Level 6 removes ground from P2 pin 7 and applies ground to the winding of relay K1, thereby operating the relay. Level 8 removes −24 v. from P3 pin 8 and applies −24 v. to the "reverse valve" 80 (Fig. 4) through P3 pin 4.

When relay K1 is operated, contact group 1 applies 250 v. through resistance R13 to tube V5 and removes 250 v. from P1 pin 7 which supplies the I. F. and audio amplifiers. Contact group 2 applies 400 v. to low pressure gas-filled tubes V6 and V7. Contact group 3 removes −150 v., cut off voltage, from V8. Contact group 4 applies −24 v. to P1 pin 4, to operate external relays which turn on the motor driving the hydraulic pump 65 (Fig. 4) and switch chassis circuits to the conditions required for tune-up, i. e. the receiver input is switched from the antenna to the output of the tune-up load attenuator. −24 v. is also applied to the contacts of relay K2 and to the group 4 contacts of relay K3.

When relay K3 is operated, contact group 4 applies −24 v. through P3 pin 6 to the "Hi-Speed" valve 70 (Fig. 4). As the motor driving hydraulic pump 65 has been turned on and as high speed valve 70 and reverse valve 80 have been opened, the tuning units I–V are successively returned to "homed" position as the respective brakes 40 are successively released by the "homing" circuit, as described above.

When the crystal stepper has selected the desired crystal, the −24 v. used in the crystal selection is returned to the tuning control circuit through P1 pin 5 to the open contact of relay K7 as a signal that the crystal selection has been completed. This voltage is furnished to the crystal selection circuit by relay K8 level 7 in positions 20 (normal) and 1 through P3 pin 7. When the "homing completed" signal described above operates relay K7, the "crystal selection completed" signal is applied to the stepper of relay K8, thereby operating the stepper to position 2.

*Position 2.*—With the relay K8 in position 2, level 1 connects "tune-up signal 1" (P1 pin 8) from the transmitter multiplier stages to the grid of tube V4A. Level 3 removes ground from the grid of tube V5, preparing the stage to receive a signal. Level 5 removes −24 v. from the "homing" circuit (P2 pin 6) and applies −24 v. through P2 pin 8 to the brake of tuning unit I on the transmitter-multiplier, to release the brake. Level 7 removes −24 v. from the crystal selection circuit connected to P3 pin 7 to prevent any change in the channel during tune-up and applies −24 v. to the "forward" valve 90 (Fig. 4) through relay K, contact group 3 and P3 pin 5. Level 8 removes −24 v. from the "reverse" valve 80 (P3 pin 4) and applies −24 v. to contact group 2 of relay K3.

As the high speed valve 70 and forward valve 90 (Fig. 4) are open and as the brake of tuning unit I is released, the transmitter-multiplier to which this unit is connected is tuned rapidly from the low frequency end of its range toward the high frequency end until a signal is reached. The time required for 200° movement at high speed is about one quarter of a second. The signal is supplied through P1 pin 8 and level 1 of relay K8 to the grid of tube V4A. The signal is positive and, as the signal voltage rises on the grid and cathode of V4A, C4 acquires an increased charge because the upper side becomes more positive than normal but the lower side remains near ground potential as grid-to-cathode conduction in V5 removes any positive charge it may acquire. After the signal is passed, the cathode of V4A and the upper plate of C4 return to the normal potential. This makes the lower plate of C4 negative with respect to ground by the amount of the signal amplitude minus a small loss in V4A. This negative potential applied to grids 1 and 3 of V5 reduces the plate current sufficiently to release relay K3.

When relay K3 is released, contact group 1 connects —150 v. through resistance R6 to grids 1 and 3 of tube V5, to keep the plate voltage of V5 below the operating current of relay K3, thereby locking the relay in released position. Contact group 3 of relay K3, on release, removes —24 v. from the "forward" valve (P3 pin 5) and applies —24 v. to the "reverse" valve (P3 pin 4) through contact group 4 of relay K4 (released). Contact group 4 on K3 removes —24 v. from the "high speed" valve (P3 pin 6). Tuning unit I will thereby be operated in reverse direction at low speed. Contact group 2 of relay K3, on release, closes a —24 v. circuit from level 8 of relay K8 to the stepping winding of said relay, thereby advancing the relay to position 3.

*Position 3.*—With stepper relay K8 in position 3, level 1 disconnects the "tune-up signal 1" from tube V4A. Level 2 connects "tune-up signal 1" to the plate of V2B. Level 4 connects the memory capacitor C2 to the grid of V1 and plate of V2A. Levels 5, 6 and 7 remain the same as in position 2. Level 8 connects —24 v. to contact group 1 of relay K4 and to the armature terminal of relay K5 which is energized at this time by the plate current of tube V1 since tube V1 is at 0 bias and is conducting. Through relay K5, this voltage is applied to contact group 2 of relay K4 which is not energized at this time, so that this circuit is open. The voltage is also applied through a resistance R32 to the winding K5W2 of relay K5. However, this has no effect on relay K5 since —24 v. is also applied to the other terminal of this winding through the crystal diode CR3 and contact group 3 of relay K4.

The transmitter-multiplier is thereby tuned back through the signal from high to low frequency at low speed. As the signal is received, levels greater than approximately 5 v. are passed through V2B to the grid of V4B where it is amplified and inverted. Tube V3 comprising sections V3A and V3B acts as a cathode follower from V4B, driving the cathode of V1. As the signal voltage rises, the cathode voltage of V1 drops. The grid voltage of V1 follows the cathode voltage but tends to be stabilized by the memory capacitor C2. However, when the cathode voltage becomes more than approximately 1 volt negative with respect to the grid, conduction occurs between the grid and cathode of V1 as well as between the plate and cathode of V2A, discharging the capacitor C2 to approximately the new minimum cathode voltage. After the signal peak has been passed, the cathode voltage rises but the grid voltage of V1 is held down by capacitor C2 to a lower value received as the signal passes the peak. After the charge in condenser C2 has dropped to a sufficiently low value, the plate current of V1 is cut off and relay K5 is released. Upon releasing, relay K5 applies —24 v. to contact groups 1 and 3 of relay K4, thereby operating relay K4. Relay K4 is locked in operated position by —24 v. applied through contact group 1 of the relay under control of level 8 of relay K8. Contact group 2 of relay K4 connects the normally open (and presently open) contact of relay K5 to the stepper contact of relay K8. Contact group 3 of K4 transfers the line furnishing —24 v. to level 5 of relay K8 (for application to the brakes) from a direct —24 v. source to —24 v. under control of relay K5 and reduced by resistance R36. Contact group 4 removes —24 v. from the reverse valve and applies —24 v. to the forward valve. The transmitter-multiplier is thereby tuned forwardly again (from low to high frequency) but at low speed.

As the signal level again rises to peak, the cathode voltage of tube V1 drops to its previous value and V1 conducts, operating relay K5. The operation of this relay removes —24 v. from the brake on tuning unit I connected with the transmitter-multiplier, thereby causing the brake to be applied and stopping rotation of the tuning unit. Relay K5 releases when the signal voltage is approximately 0.2 v. below peak since K5 does not require perfect balance. The slight discharge of the memory condenser C2 is also a factor in causing K5 to release slightly below peak signal voltage. This compensates for a lag of a few multiseconds in operation of the brake so that the unit is tuned accurately on the signal. Through the operation of K5, —24 v. is again applied to a terminal of winding K5W2 of the relay through a resistance R32. Since the voltage has been removed from the other terminal of this winding by the de-energizing of the brake, the relay winding K5W2 is energized to lock the relay in operated position. The relay K5 is a polarized relay. —24 v. is also applied through relay K5 and contact group 2 of relay K4 to the stepping magnet of relay K8 to step the latter relay to position 4.

*Position 4.*—When the relay K8 moves to position 4, level 2 opens the connection of the "tune-up signal 1" (P1 pin 8) to tube V2B. Level 3 applies ground to the grid of tube V5, causing the plate current of the tube to rise to normal and operate relay K3. Level 4 transfers the memory capacitor C2 from the grid of V1 to the cathode of V1, as in positions 1 and 2, in order to replace the charge lost in the "memorizing" operation, in preparation for memorizing the next tune-up signal. Level 5 opens the brake circuit of tuning unit I, already previously opened by relay K5. Level 8 transfers —24 v. from the locking circuit of relay K4 and armature of relay K5, releasing K4 and applying —24 v. to the self stepping contacts of relay K8, thereby advancing the relay to position 5.

*Position 5.*—Upon movement of relay K8 to position 5, level 1 connects "tune-up signal 2" from the transmitter-tripler (P1 pin 9) to the grid of tube V4A. Level 3 removes ground from the grid of tube V5, preparing it to receive the signal. Level 5 connects —24 v. to the brake on tuning unit II, thereby releasing this tuning unit. Level 8 applies —24 v. to contact group 2 of relay K3 for operation of the stepper when a signal is received. The operation is otherwise the same as in position 2.

*Subsequent positions.*—From this point, the sequence of operations is the same as in positions 2, 3 and 4, repeating for each unit to be tuned. Level 5 of relay K8 connects the tuning circuit successively with the brakes of tuning units to be operated. Upon completion of the tuning of all of the units—in position 16 when five units are used—level 8 of relay K8 supplies —24 v. to the stepper contacts of the relay, so that the relay continues to step until it has returned to position 20 (normal). In this position, level 3 of relay K8 restores microphone ground to P1 pin 6. Level 4 connects capacitor C2 to the I. F. amplifier through P2 pin 2. Level 6 connects the tuning indicator remote control (P2 pin 7) to ground. Level 7 supplies —24 v. to the crystal selector through P3 pin 7. Level 8 supplies —24 v. to the crystal oven through P3 pin 8. Relay K1 is de-energized since it is no longer connected to ground through relay K8 level 7 and the motor driving the hydraulic pump is thereby stopped.

If any unit should fail to tune up properly, the tuning control circuit will not advance further but, after approximately thirty seconds, the time delay circuit comprising condenser C1, resistance R3, tube V8 and relay K2 will return relay K8 to normal. This circuit operates as follows: When the tuning control circuit is not in operation, approximately —90 v. (—150 v. reduced through tube E1) is applied to the grid of tube V8, cutting off the plate current completely. Therefore, condenser C1 charges to the difference between plate voltage and grid voltage namely 220 v.+90 v.=340 v. When the −150 v. connection is broken by the operation of relay K1 at the beginning of a tuning cycle, C1 discharges slowly through R3. The time of discharge would be approximately ten seconds if it were not that C1 is connected in a "bootstrap" circuit, so that, as the grid voltage of V8 approaches zero and plate current begins to flow, the plate voltage is reduced through resistance R4 and the winding of relay K2. The lower side of C1 is nearly at ground potential so that the discharge through R3 is slow. As the grid voltage rises, the plate voltage drops, so that C1 discharges approximately 100 v. at the rate of discharge that would be normal for about 10 v. When the plate current is sufficient, relay K2 operates to supply −24 v. through relay K1 to the stepping contacts of relay K8. This causes relay K8 to step continuously until it reaches normal position, whereupon relay K1 is released and stepping ceases. The tuning cycle may thereupon be initiated again in like manner.

It will be seen from the foregoing description that the present invention provides a simple and effective tuning system that will tune any desired number of units one after another and effect the tuning quickly and accurately. While the invention has been described with reference to a particular circuit, it will be understood that it is equally applicable to other uses and is in no way limited to the particular embodiments herein shown and described.

What I claim and desire to secure by Letters Patent is:

1. In an automatic tuning system, a plurality of tuning units each comprising a reversible fluid pressure motor having an impeller movable alternately in opposite directions and an electromagnetic brake for releasably holding the impeller against movement, means for connecting the impeller of each motor with an element to be tuned, means for supplying pressure fluid to all of the motors concurrently, electrically controlled means for reversing the supply of pressure fluid to the motors, electrically controlled means for variably controlling the rate of flow of fluid to the motors to control the speed of the motors, and an electrical control circuit comprising means for supplying power cyclically to said reversing means and speed control means to supply pressure fluid for driving said motors first in a forward direction at high speed, then in reverse direction at low speed and then in forward direction at low speed, a memory circuit, means for feeding a signal to said memory circuit during said reverse movement to record a signal peak, a brake control circuit including a relay controlled by said memory circuit and a stepping relay successively connecting said brakes to the brake control circuit to maintain each brake in turn released during the fast forward movement, the slow reverse movement and the slow forward movement of the respective motor until the signal peak is again reached in said slow forward movement whereupon the brake is applied to stop movement of said motor.

2. In an automatic tuning system, a plurality of tuning units each comprising a reversible fluid pressure motor having an impeller movable alternately in opposite directions and an electromagnetic brake for releasably holding the impeller against movement by said fluid pressure, means connecting the impeller of each motor with an element to be tuned, means for supplying pressure fluid to all of the motors concurrently, electrically controlled means for reversing the supply of pressure fluid to the motors, electrically controlled means for variably controlling the rate of flow of fluid to the motors to control the speed of the motors, and an electrical control circuit comprising means for supplying power to said reversing means and said speed control means in predetermined cycle to reverse the direction of movement of the motors and to vary the speed of movement, a memory circuit, means for feeding a signal to said memory circuit during movement of a motor in one direction to record a signal peak, a brake control circuit including a relay controlled by said memory circuit to apply a brake when the peak signal is again reached during movement in the opposite direction and a stepping relay for successively connecting said brakes to the brake control circuit whereby each is controlled in turn by the same brake control circuit and memory circuit.

3. In an automatic tuning system, a plurality of tuning units each comprising a reversible fluid pressure motor having an impeller movable alternately in opposite directions and an electromagnetic brake for releasably holding the impeller against movement by said fluid pressure, means connecting the impeller of each motor with an element to be tuned, means for supplying pressure fluid to all of the motors concurrently, electrically controlled means for reversing the supply of pressure fluid to the motors, electrically controlled means for varying the rate of flow of fluid to the motors to vary the speed of the motors, and an electrical control circuit comprising means for supplying power to said reversing means and speed control means in predetermined sequence to reverse the direction of operation of the motors and to vary their speed, a memory circuit comprising a tube having a cathode, grid and plate, a condenser connected to the grid of said tube, means for feeding a signal voltage to the cathode of said tube during movement of a motor in one direction, the condenser being left with a charge equal to peak signal voltage by cathode to grid conduction, a brake control circuit including a relay having a winding connected to the plate of said tube, said relay being operated by cathode to plate conduction when the signal peak is again reached during movement of said motor in the opposite direction, and a stepping relay for successively connecting said brakes to the brake control circuit whereby each brake is controlled in turn by said brake control circuit and memory circuit.

4. In an automatic tuning system, a plurality of tuning units each comprising a reversible fluid pressure motor having an impeller movable alternately in opposite directions and an electromagnetic brake for releasably holding the impeller against movement by said pressure, means connecting the impeller of each motor with an element to be tuned, means for supplying pressure fluid to all of the motors concurrently, electrically controlled means for reversing the supply of pressure fluid to the motors, electrically controlled means for varying the rate of flow of fluid to the motors to vary the speed of the motors, and an electrical control circuit comprising means for supplying power to said reversing means and said speed control means in predetermined sequence to reverse the motors and control their speed, a memory circuit comprising a tube having a cathode, grid and plate, a condenser connected to the grid of said tube, means for inverting and amplifying a signal and for applying the resulting signal voltage to the cathode of said tube, a brake control circuit including a relay having a winding connected to the plate of said tube to operate said relay by flow of plate current, and a stepping relay for successively connecting said brakes to the brake control circuit whereby each brake is controlled in turn by said brake control circuit and memory circuit.

5. In an automatic tuning system, a plurality of tuning units each comprising a reversible fluid pressure motor having an impeller movable alternately in opposite directions and an electromagnetic brake for releasably holding the impeller against movement by said pressure, means connecting the impeller of each motor with an element to be tuned, means for supplying pressure fluid to all of the motors concurrently, electrically controlled means for reversing the supply of pressure fluid to the motors, electrically controlled means for varying the rate of flow of fluid to the motors to vary the speed of the motors, and an electrical control circuit comprising means for supplying power to said reversing means and said speed control means in predetermined sequence to reverse the motors and control their speed, a memory circuit comprising a tube having a cathode, grid and plate, a condenser connected to the grid of said tube, means for applying a signal voltage to the cathode of said tube, a diode connected between the cathode and grid of said tube, a brake control circuit including a relay connected to the plate of said tube and operated by the plate current and a stepping relay successively connecting said brakes to the brake control circuit, each brake being in turn connected to and controlled by said brake control circuit during a sequence of operation.

6. In an automatic tuning system, a plurality of tuning units each comprising a reversible fluid pressure motor having a movable impeller and an electromagnetic brake for releasably locking the impeller against movement, means connecting the impeller of each motor with an element to be tuned, means for supplying pressure fluid to all of the motors concurrently, electrically controlled means for reversing the supply of pressure fluid, and an electrical control circuit comprising a memory circuit including a tube having a cathode, grid and plate, a condenser connected to the grid of said tube, means for applying a signal voltage to the cathode of said tube, a brake control circuit including a first relay connected to the plate of said tube and operated by plate current, a second relay connected to the first relay and operated by the first relay when in deenergized position, means connecting said reversing means to said second relay to reverse the direction of a motor upon operation of said second relay and means including a stepping relay successively connecting said brakes to said first relay to apply the brake when the said first relay is operated.

7. In an automatic tuning system, a plurality of tuning units each comprising a reversible fluid pressure motor having a movable impeller and an electromagnetic brake for releasably locking the impeller against movement, means connecting the impeller of each motor with an element to be tuned, means for supplying pressure fluid to all of the motors concurrently, electrically controlled means for reversing the supply of pressure fluid to the motors to reverse the motors and an electrical control circuit comprising a reversing circuit including a first tube having a cathode, grid and plate, means for feeding a signal to the grid of said tube, a second tube having a cathode, grid and plate, a condenser connected between the cathode of first tube and grid of said second tube, a first relay connected to the plate of said second tube and operable by the plate current and connections between said reversing means and said first relay to reverse the flow of fluid upon operation of said first relay, a memory circuit, means for feeding a signal to said memory circuit during movement of a motor in one direction to record a signal peak, a brake control circuit including a relay controlled by said memory circuit to apply a brake when the peak signal is again reached during movement in the opposite direction and a stepping relay for successively connecting said brakes to the brake control circuit whereby each brake is controlled in turn by the same brake control circuit and memory circuit.

8. In an automatic tuning system, a plurality of tuning units each comprising a reversible fluid pressure motor having an impeller movable alternately in opposite directions and an electromagnetic brake for releasably holding the impeller against movement, means for connecting the impeller of each motor with an element to be tuned, means providing a supply of fluid under pressure, conduits connecting all of said motors with said pressure fluid supply, the motors being connected in parallel with one another, an electrically controlled reversing valve to reverse the direction of flow of fluid supplied to said motors and thereby reverse the motors and an electrical control circuit comprising a brake control circuit, a circuit controlling said reversing valve and a coordinating circuit including a stepping relay connecting the brakes one after another to the brake control circuit to be controlled individually by said circuit to release a brake and permit operation of the respective motor while the remaining motors are held inoperative by their respective brakes.

9. In an automatic tuning system, a plurality of tuning units each comprising a reversible fluid pressure motor having an impeller movable alternately in opposite directions and an electromagnetic brake for releasably holding the impeller against movement, means for connecting the impeller of each motor with an element to be tuned, means providing a supply of fluid under pressure, conduits connecting all of said motors with said pressure fluid supply, the motors being connected in parallel with one another and all being supplied with pressure fluid concurrently, electrical means for reversing the direction of flow of said fluid to reverse the motors, an electrically controlled valve for varying the rate of flow of fluid to the motors and thereby varying the speed of the motors and an electrical control circuit comprising a circuit controlling said reversing means and speed valve, a brake control circuit and a coordinating circuit including a stepping relay connecting the brakes one after another to the brake control circuit to be controlled individually by said circuit to release a brake and permit operation of the respective motor by said fluid pressure while the remaining motors are held inoperative by their respective brakes.

10. In an automatic tuning system, a plurality of tuning units each comprising a reversible hydraulic motor having an impeller movable alternately in opposite directions, each motor having two ports, and an electromagnetic brake for releasably holding the impeller against movement, means for connecting the impeller of each motor with an element to be tuned, a closed hydraulic system comprising a reservoir, a pump, a reversing valve, a speed control valve and conduits connecting said reservoir, pump, valves and motors, the motors being connected in parallel with one another and all being supplied with pressure fluid concurrently, said pump and valves being electrically operated, and an electrical control circuit comprising means for supplying power to said pump and said valves in predetermined sequence to provide fluid pressure, reverse the direction of said motors and vary the speed of said motors, a brake control circuit and a coordinating circuit including a stepping relay connecting the brakes one after another to the brake control circuit to be controlled individually by said circuit to release a brake and permit operation of the respective motor by said fluid pressure while the remaining motors are held inoperative by their respective brakes.

11. In an automatic tuning system, a plurality of tuning units each comprising a circular chamber, a rotor rotatable in said chamber and coextensive with said chamber in an axial direction, and being of lesser diameter than said chamber, a fixed barrier projecting inwardly from the periphery of said chamber to the periphery of the rotor, ports opening into said chamber on opposite sides of said barrier, a vane projecting radially from the periphery of the rotor to the inner periphery of the chamber and an electromagnetic brake in axial alignment with and coupled to said rotor, means for connecting said rotor with an element to be tuned, a source of pressure fluid, conduits connecting said source with said ports, said units being connected in parallel, electrically operated means for reversing the flow of said fluid to the units to drive the rotors alternately in opposite directions, electrically operated means for varying the rate of flow of said fluid and thereby varying the speed of movement of said rotors, and an electrical control circuit comprising means for supplying power to said reversing means and speed-varying means in predetermined sequence to reverse the direction of movement and vary the speed of said rotors, a brake control circuit and a coordinating circuit including a stepping relay connecting said brakes one after another to the brake control circuit to be controlled individually by said circuit to release a brake and permit operation of the respective rotor by said fluid while the remaining rotors are held inoperative by their respective brakes.

12. In an automatic tuning system, a plurality of tuning units each comprising a circular chamber, a rotor rotatable in said chamber, said rotor being coextensive with the chamber in an axial direction and of lesser diameter than the chamber, a fixed barrier projecting inwardly from the periphery of the chamber to the periphery of the rotor, ports opening into said chamber on opposite sides of said barrier, a vane projecting radially from the periphery of the rotor to the inner periphery of the chamber, a shaft extending axially from said rotor and rotatable therewith, a movable brake member carried by and rotatable with said shaft and movable axially relative to said rotor, a fixed brake member engageable with the movable brake member by relative axial movement thereof, spring means normally holding said brake members in engagement with one another, an electromagnet for disengaging the brake members to free the rotor and shaft for rotation, means for connecting said shaft with an element to be tuned, a source of pressure fluid, conduits connecting said source with said ports, said units being connected in parallel with one another, electrically operated means for reversing the flow of fluid to the units to drive the rotors alternately in opposite directions, electrically operated means for varying the rate of flow of said fluid and thereby varying the speed of movement of said rotors, and an electrical control circuit comprising means for supplying power to said reversing means and speed varying means in predetermined sequence to reverse the direction and vary the speed of movement of said rotors, a brake control circuit and a coordinating circuit including a stepping relay connecting the electromagnets of the brakes one after another to the brake control circuit to energize a selected electromagnet and thereby release the associated rotor for rotation by said fluid while the remaining rotors are held inoperative by their respective brake members.

13. In an automatic tuning system, a tuning unit comprising a fluid pressure motor having a rotor, a shaft extending axially from said rotor, means connecting the rotor and shaft to rotate together while permitting limited axial movement of the shaft relative to the rotor, a movable brake member carried by said shaft, a stationary brake member, the movable brake member being engageable with and disengageable from said stationary brake member by axial movement of said shaft, a spring for moving the shaft in a direction to engage the brake members, an electromagnet surrounding said shaft, an armature fixed on said shaft and acted on by said electromagnet for effecting movement of the shaft in the opposite direction to release the brake members from one another and means for connecting the shaft to an element to be tuned.

14. In an automatic tuning system, a plurality of tuning units each comprising a reversible fluid pressure motor having an impeller movable alternately in opposite directions and an electromagnetic brake for releasably holding the impeller against movement, means connecting the impeller of each motor with an element to be tuned, means for supplying pressure fluid to all of the motors concurrently, means for reversing the supply of pressure fluid to the motors, means for variably controlling the rate of flow of fluid to the motors to control the speed of the motors, a brake control circuit and a stepping relay for successively connecting said brakes to the brake control circuit whereby each brake is controlled in turn by the same brake control circuit, said brakes being normally applied and having sufficient holding power to hold the impeller against movement by said fluid pressure and being individually releasable when energized by current supplied by said brake control circuit through said stepping relay.

15. In an automatic tuning system, a plurality of tuning units each comprising a reversible fluid pressure motor having an impeller movable alternately in opposite directions and an electromagnetic brake for releasably holding the impeller against movement, means connecting the impeller of each motor with an element to be tuned, means for supplying pressure fluid to all of the motors concurrently, electrically controlled means for reversing the supply of pressure fluid to the motors, electrically controlled means for variably controlling the rate of flow of fluid to the motors to control the speed of the motors, and an electrical control circuit comprising means for supplying power cyclically to said reversing means and speed control means, a brake control circuit and a stepping relay successively connecting said brakes to the brake control circuit whereby each brake is controlled in turn by the same brake control circuit, said brakes being normally applied and having sufficient holding power to hold the impeller of the respective motor against movement by said fluid pressure, and being individually releasable when energized by current supplied by said brake control circuit through said stepping relay.

16. In an automatic tuning system, a tuning unit comprising a reversible fluid pressure motor having an impeller movable alternately in opposite directions and an electromagnetic brake for releasably holding the impeller against movement, means connecting the impeller of the motor with an element to be tuned, means for supplying fluid pressure to said motor, electrically controlled means for reversing the supply of pressure fluid to the motor, electrically controlled means for variably controlling the rate of flow of fluid to the motor to control the speed of the motor, and an electrical control circuit comprising means for supplying power cyclically to said reversing means and speed control means to supply pressure fluid for driving said motor first in a forward direction at high speed, then in reverse direction at low speed and then in forward direction at low speed, a memory circuit, means for feeding a signal to said memory circuit during said reverse movement to record a signal peak and a brake control circuit including a relay controlled by said memory circuit to maintain said brake released during the fast forward movement, the slow reverse movement and the slow forward movement of the motor until the signal peak is again reached in said slow forward movement whereupon the brake is applied to stop movement of said motor.

17. In an automatic tuning system, a tuning unit comprising a reversible fluid pressure motor having an impeller movable alternately in opposite directions and an electromagnetic brake for releasably holding the impeller against movement, means connecting the impeller of the motor with an element to be tuned, means for supplying fluid pressure to said motor, electrically controlled means for reversing the supply of pressure fluid to the motor, means for controlling the rate of flow of fluid to the motor to control the speed of the motor, and an electrical control circuit comprising means for supplying power cyclically to said reversing means to supply pressure fluid for driving said motor first in one direction and then in the other, a memory circuit, means for feeding a signal to said memory circuit during movement of the motor in one direction to record a signal peak, and a brake control circuit including a relay controlled by said memory circuit to maintain said brake released during movement of the motor in one direction and then in the opposite direction, until the signal peak is again reached whereupon the brake is applied to stop movement of said motor.

18. In an automatic tuning system, a plurality of tuning units each comprising a reversible motor having a rotor movable alternately in opposite directions and an electromagnetic brake for releasably holding the rotor against movement, means connecting each motor with an element to be tuned, means for supplying power to all of said motors concurrently, electrically controlled means for reversing the motors and for varying their speed, and an electrical control circuit comprising means for supplying current cyclically to said reversing means and speed control means to operate said motors first in a forward direction at high speed, then in a reverse direction at low speed and then in a forward direction at low speed, a memory circuit, means for feeding a signal to said memory circuit during said reverse movement to record a signal peak, a brake control circuit including a relay controlled by said memory circuit and a stepping relay successively connecting said brakes to the brake control circuit to maintain each brake in turn released during the fast forward movement, the slow reverse movement and the slow forward movement of the respective motor until the signal peak is again reached in said slow forward movement, whereupon the brake is applied to stop movement of said motor.

19. In an automatic tuning system, a plurality of tuning units each comprising a reversible motor having a rotor movable alternately in opposite directions and an electromagnetic brake for releasably holding the rotor against movement, means connecting each motor with an element to be tuned, means for supplying power to all of said motors concurrently, electrically controlled means for reversing the motors and an electrical control circuit comprising means for supplying current cyclically to said reversing means to operate said motors first in one direction and then in the other, a memory circuit, means for feeding a signal to said memory circuit during movement of the motor in one direction to record a signal peak, and a brake control circuit including a relay controlled by said memory circuit and a stepping relay successively connecting said brakes to the brake control circuit to maintain each brake in turn released during movement of the motor in one direction for the memorizing of a signal and then in the opposite direction until the signal peak is again reached, whereupon the brake is applied to stop movement of said motor.

References Cited in the file of this patent

UNITED STATES PATENTS

| | | |
|---|---|---|
| 798,286 | Kimman | Aug. 29, 1905 |
| 1,403,569 | Rogers | Jan. 17, 1922 |
| 1,561,722 | Jimerson | Nov. 17, 1925 |
| 1,965,751 | Rush | July 10, 1934 |
| 2,044,645 | Stapleton | June 16, 1936 |
| 2,053,668 | Kinzie et al. | Sept. 8, 1936 |
| 2,082,430 | Townsend | June 1, 1937 |
| 2,246,923 | Meunier | June 24, 1941 |
| 2,304,871 | Andrews | Dec. 15, 1942 |
| 2,444,391 | Whitfield | June 29, 1948 |
| 2,488,122 | Griffith | Nov. 15, 1949 |
| 2,528,489 | Bednash et al. | Nov. 7, 1950 |
| 2,584,578 | Gull | Feb. 5, 1952 |